(12) United States Patent
Matsuda

(10) Patent No.: US 8,077,164 B2
(45) Date of Patent: Dec. 13, 2011

(54) DRAWING APPARATUS

(75) Inventor: Katsunori Matsuda, Kanagawa (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 942 days.

(21) Appl. No.: 12/022,507

(22) Filed: Jan. 30, 2008

(65) Prior Publication Data

US 2008/0180409 A1     Jul. 31, 2008

(30) Foreign Application Priority Data

Jan. 31, 2007   (JP) ................................ 2007-020404

(51) Int. Cl.
*G06F 3/043* (2006.01)
(52) U.S. Cl. .................... 345/177; 348/333.12
(58) Field of Classification Search ........... 345/173–182
See application file for complete search history.

(56) References Cited

U.S. PATENT DOCUMENTS

2005/0117044 A1 * 6/2005 Suto ......................... 348/333.12

FOREIGN PATENT DOCUMENTS

| JP | 2-295282 A | 12/1990 |
| JP | 11-341314 A | 10/1999 |
| JP | 11341314 A * | 12/1999 |
| JP | 2003-153157 A | 5/2003 |
| JP | 2004-173300 A | 6/2004 |
| JP | 2004-199299 A | 7/2004 |
| JP | 2005-184778 A | 7/2005 |

OTHER PUBLICATIONS

Japanese Office Action dated Jan. 27, 2009, issued in corresponding Japanese Patent Application No. 2007-020404.
Japanese Office Action dated Sep. 8, 2009, issued in corresponding Japanese Patent Application No. 2007-020404.

* cited by examiner

*Primary Examiner* — Kevin M Nguyen
*Assistant Examiner* — Kenneth B Lee, Jr.
(74) *Attorney, Agent, or Firm* — Westerman, Hattori, Daniels & Adrian, LLP

(57) ABSTRACT

A drawing apparatus includes a CPU. Target image data is written to a drawing area of an SDRAM, and the CPU performs resolution changing processing in a descending direction on the image data of the drawing area. The result of the resolution changing processing is written to a displaying area of the SDRAM, and an LCD monitor displays a low-resolution image on the basis of the image data of the displaying area on a display surface. On the display surface, a detection surface of a touch panel is laminated. When a touch operation is performed on the touch panel in order to draw and write an image and a character on the image of the display surface, the CPU repetitively detects a position of a touched point via the detection surface, and performs drawing processing dot by dot on the image data of the drawing area on the basis of the detection result. Furthermore, every time that a plurality of executions of the drawing processing are performed, the resolution changing processing is performed on the image data of the drawing area, so that the image on the display surface is periodically updated.

13 Claims, 7 Drawing Sheets

FIG. 2
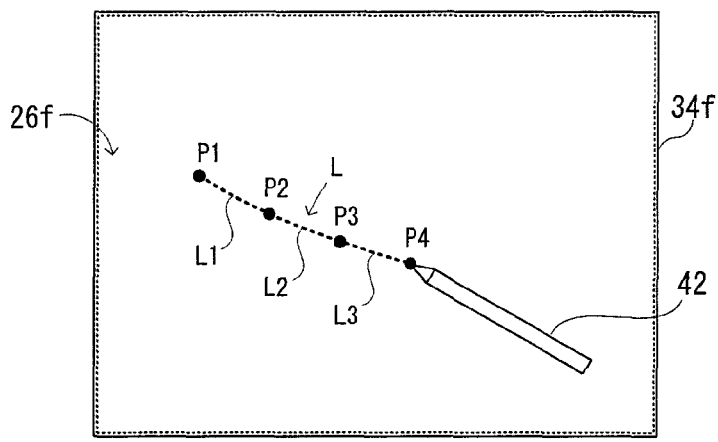
FIG. 3
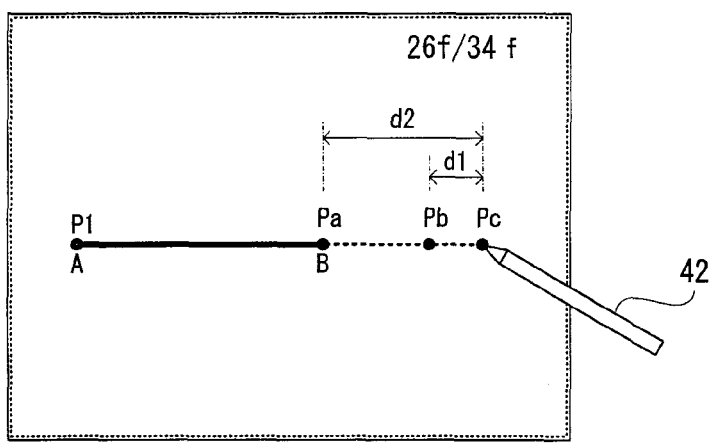
FIG. 4
(A)
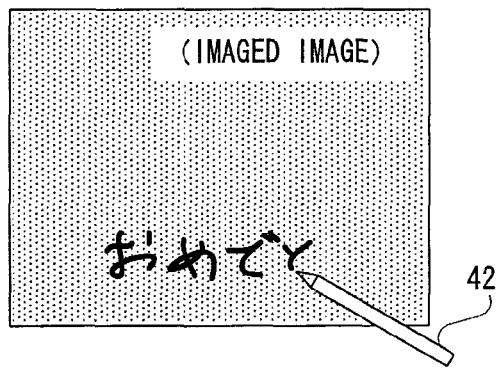
(B)
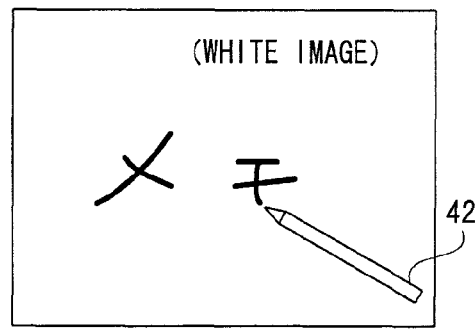

DRAWING APPARATUS

CROSS REFERENCE OF RELATED APPLICATION

The disclosure of Japanese Patent Application No. 2007-20404 is incorporated herein by reference.

BACKGROUND OF THE INVENTION

1. Field of the Invention

The present invention relates to a drawing apparatus. More specifically, the present invention relates to a drawing apparatus which are applied to an electronic camera and draws an image of a picture and a character in a target image in response to an operation of a pointing device such as a touch panel, etc.

2. Description of the Related Art

In a related art, a touch panel is set on a monitor, and a target image is displayed on the monitor. When a user slides a pen tip on the touch panel in order to draw or write an image and a character on the image of the monitor, a position of the touched point is repetitively output from the touch panel, and a computer draws an image of a locus along a series of torched points on the target image. As the drawing processing proceeds, the displayed image on the monitor is also updated. The image on which the drawing processing is performed is recorded in a recording medium in response to a recording operation.

However, a resolution of an image (the number of pixels) is different between an image for drawing and an image for displaying. The image for displaying is generated by performing resolution changing processing (the number of pixels converting processing) on the image for drawing. That is, every time that a touched point is detected, drawing processing and resolution changing processing with respect to the image on which the drawing processing has been performed are executed, so that especially, for a high resolution image, a delay of the processing may occur. More specifically, drawing and displaying the touched locus cannot follow the movement of the pen tip.

SUMMARY OF THE INVENTION

In one aspect of the present invention, a drawing apparatus, comprises: a writer for writing image data to a first memory; a first resolution changer for changing a resolution of the image data stored in the first memory into a descending direction, and writing low-resolution image data obtained through the change to a second memory; a display for displaying an image on the basis of the low-resolution image data stored in the second memory on a display surface; a designator for designating an arbitrary point within the display surface; a drawer for performing drawing processing on the image data in the first memory according to a movement of a point designated by the designator; and an activator for alternatively and repetitively activating the first resolution changer and the drawer such that importance is placed on the drawer.

A writer writes image data to a first memory. A first resolution changer changes a resolution of the image data stored in the first memory in a descending direction, and writes low-resolution image data obtained through the change to a second memory. A display displays an image on the basis of the low-resolution image data stored in the second memory on a display surface. When a designator designates an arbitrary point within the display surface, a drawer performs drawing processing on the image data in the first memory according to a movement of a point designated by the designator. An activator alternatively and repetitively activates the first resolution changer and the drawer such that importance is placed on the drawer.

By alternative and repetitive activation of the first resolution changer and the drawer by the activator, it is possible to perform in parallel the drawing processing of the image data in the first memory and the resolution decreasing processing of the image data in the first memory for updating the display. Furthermore, by placing importance on the drawer in the activating processing, frequency of execution of the resolution changing processing for updating the display is reduced.

BRIEF DESCRIPTION OF THE DRAWINGS

FIG. 2 is an illustrative view showing touch detecting processing utilizing a touch panel executed in FIG. 1 embodiment;

FIG. 3 is an illustrative view showing a definition of a delay of drawing and a delay of display updating which occur in FIG. 1 embodiment;

FIG. 4(A) is an illustrative view showing a display example in a case that a painting mode is selected in FIG. 1 embodiment;

FIG. 4(B) is an illustrative view showing a display example in a case that a notepad mode is selected in FIG. 1 embodiment;

DETAILED DESCRIPTION OF THE PREFERRED EMBODIMENTS

Figure 1:
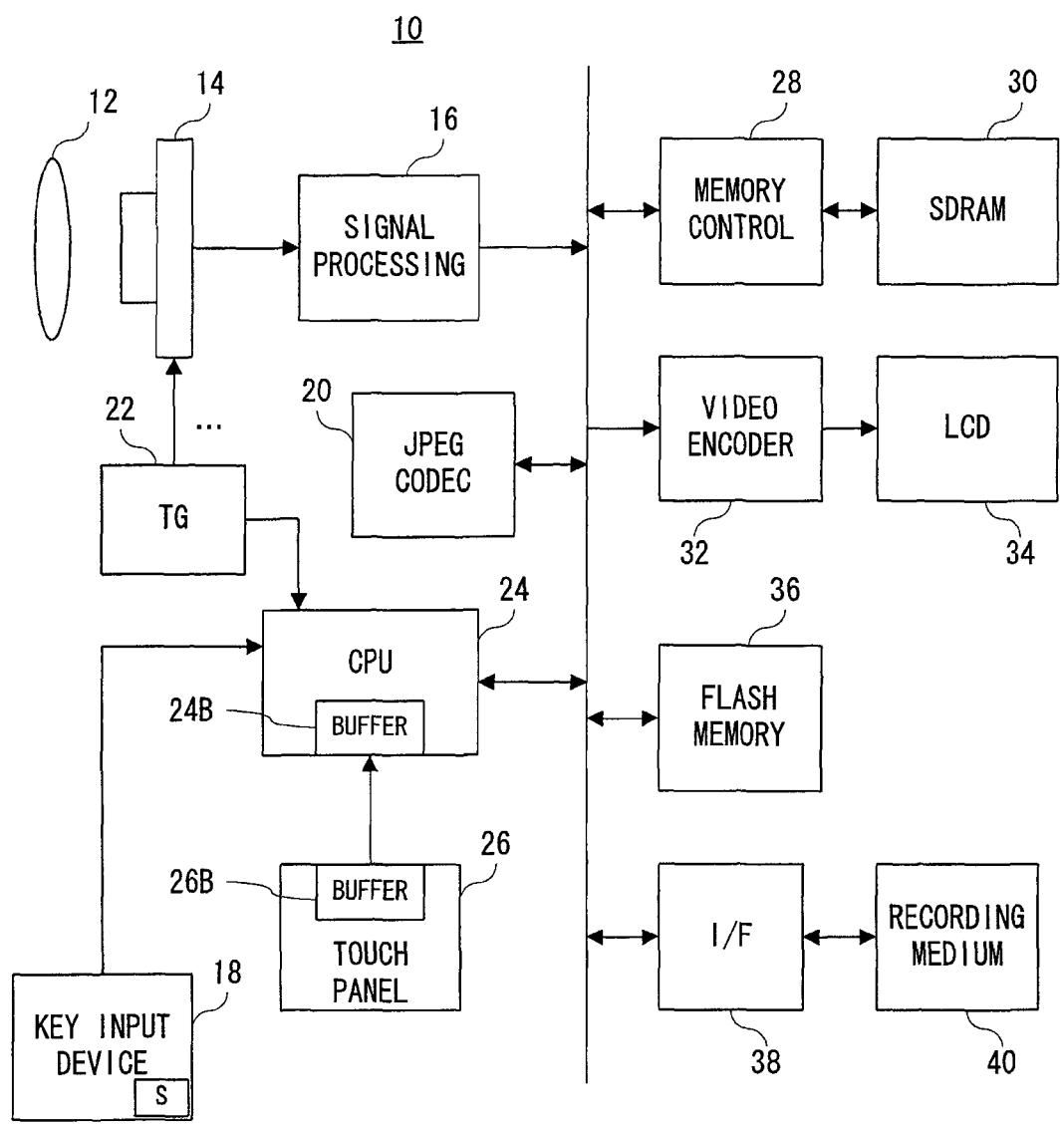
FIG. 1 is a block diagram showing one embodiment of the present invention.

Referring to FIG. 1, a digital camera 10 in this embodiment includes an optical lens 12. An optical image of an object scene is irradiated onto an image sensor 14 through the optical lens 12. The image sensor 14 generates electric charges, that is, a raw image signal representing the object scene by a photoelectronic conversion.

When a power source is turned on, the CPU 24 instructs the image sensor 14 to repeat a pre-exposure and a thinning-out reading in order to execute through image processing. The image sensor 14 executes a pre-exposure and a thinning-out reading of the electric charges thus obtained. The raw image signal generated in the image sensor 14 is read at a ratio of $\frac{1}{30}$ seconds in an order according to a raster scanning. It should be noted that a plurality of timing signals for periodically operating the image sensor 14, the CPU 24, etc. are generated by a timing generator (TG) 22.

The raw image signal output from the image sensor 14 is subjected to an A/D conversion, a color separation, a YUV conversion, etc. by a signal processing circuit 16. The CPU 24 writes image data in a YUV format output from the signal processing circuit 16 to an SDRAM 30 through the memory control circuit 28.

A video encoder 32 reads the image data stored in the SDRAM 30 through the memory control circuit 28 for each $\frac{1}{30}$ seconds, and converts the read image data into a composite video signal. Consequently, a real-time motion image (through-image) representing an object scene is displayed on the LCD monitor 34.

When a shutter button S is full-depressed, the CPU 24 instructs the image sensor 14 to perform a primary exposure and an all-pixel reading in order to execute record processing, and instructs a JPEG codec 20 to execute a JPEG compression.

The image sensor 14 executes a primary exposure and a reading of all the electric charges thus obtained. The raw image signal generated by the image sensor 14 is read in an order according to a raster scanning. The raw image signal output from the image sensor 14 is converted into image data in a YUV format by the above-described processing. The converted image data is written to the SDRAM 30 through the memory control circuit 28.

The JPEG codec 20 reads the image data stored in the SDRAM 30 through the memory control circuit 28, compresses the read image data in a JPEG system, and writes compressed image data, that is, JPEG data to the SDRAM 30 through the memory control circuit 28. The JPEG data thus obtained is then read by the CPU 24, and recorded in a recording medium 40 in a file format through an I/F 38.

When a reproduction mode is selected by the key input device 18, reproduction processing of a desired JPEG file is executed. The CPU 24 accesses the recording medium 40 through the I/F 38, and reads JPEG data stored in the desired JPEG file. The read JPEG data is written to the SDRAM 30 through the memory control circuit 28.

The JPEG codec 20 reads the JPEG data from the SDRAM 30 through the memory control circuit 28, expands the read JPEG data, and writes the expanded image data to the SDRAM 30 through the memory control circuit 28. The CPU 24 reads the image data from the SDRAM 30 through the memory control circuit 28, performs resolution changing processing on the read image data, and writes low-resolution image data thus obtained to the SDRAM 30 through the memory control circuit 28.

The video encoder 32 reads the low-resolution image data stored in the SDRAM 30 through the memory control circuit 28, converts the read image data into a composite video signal in an NTSC system, and outputs the converted composite video signal to the LCD monitor 34. Consequently, a desired image is displayed on the monitor screen.

The digital camera 10 of this embodiment further includes a touch panel 26. A detection surface 26f of the touch panel 26 is about as large as a display surface 34f of the LCD monitor 34, and laminated on the display surface 34f (see FIG. 2). The display surface 34f includes pixels of 640×480 arranged in a two-dimensional manner, and the detection surface 16f includes sensors of 640×480 arranged in a two-dimensional manner. When each of the sensors detects a pressure (or static electricity) being above a threshold value, it outputs "1", and otherwise, it outputs "0". It should be noted that the resolution of the display surface 34f and the number of sensors of the detection surface 16f need not to be equal to each other. The touch panel 26 includes a buffer 26B, and detection results by a group of sensors are temporarily held in the buffer 26B.

When a painting mode or a notepad mode is selected by the key input device 18, drawing processing utilizing the touch panel 26 is executed. A user performs a touch operation on the detection surface 16f with a touch pen 42 in order to draw or write a picture and a character on the image of the display surface 34f. The CPU 24 determines the presence or absence of a touch operation referring to the data in the buffer 26B every $\frac{1}{100}$ minutes, and calculates coordinates of a touched point (touched coordinates) in a touched-on state. Here, the touched-on state means a state that the touch pen 42 contacts the detection surface 16f, that is, the data of the buffer 26B includes "1". The touched coordinates are described by a coordinate system of the touch panel 26, that is, (0, 0)-(639, 479).

Figure 6:
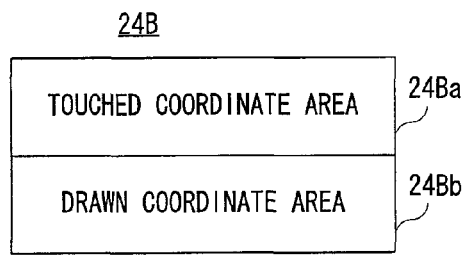
FIG. 6 is an illustrative view showing a part of a buffer formed in the CPU of FIG. 1 embodiment.

The CPU 24 includes a buffer 24B where a touched coordinate area 24Ba and a drawn coordinate area 24Bb are formed (see FIG. 6). The calculated touched coordinates are written to the touched coordinate area 24Ba.

In this manner, writing touched coordinates to the touched coordinate area 24Ba by the CPU 24 is performed at a rate of 100 points per second. At the same time, the CPU 24 executes drawing processing on the basis of the touched coordinates stored in the touched coordinate area 24Ba. More specifically, as shown in FIG. 2, a curve through a series of detected torched points P1, P2, . . . , that is, a touched locus L is calculated, and an image of the calculated touched locus L is drawn on a target image. The target image is a photographed image for the painting mode, and a white image for the notepad mode.

The drawing processing is executed every time that a touched point is detected. That is, the CPU 24 first captures coordinates of the touched points P1 and P2 to thereby draw a locus L1, then captures coordinates of a touched point P3 to thereby draw a locus L2, and captures coordinates of a touched point P4 to thereby draw a locus L3.

At the same time, the CPU 24 performs resolution changing processing on the image on which the drawing processing has been performed. Thus, a low-resolution image on the basis of the image on which the resolution changing processing has been performed is displayed on the display surface 34f. The resolution changing processing is executed every 10 executions of the drawing processing in the painting mode, and is executed every 5 executions of the drawing processing in the notepad mode.

Accordingly, drawing in the target image is performed at intervals of $\frac{1}{100}$ seconds while updating of an image on the display surface 34f (display image) is executed at intervals of $\frac{1}{10}$ seconds in the painting mode, and is executed at intervals of $\frac{1}{20}$ seconds in the notepad mode. The target image on which the series of drawing processing are performed is recorded in the recording medium 40 through the I/F 38 when a recording operation by the key input device 18 is performed.

Thus, in the painting mode or the notepad mode, the CPU 24 executes in parallel calculating processing of the touched coordinates, drawing processing to the target image, and updating processing of the display image. The resolution changing processing included in the last processing takes much load, so that a delay of drawing d1 and a delay of display updating d2 are increased as shown in FIG. 3.

Referring to FIG. 3, a touched point P1 is the first touched point, and corresponds to a start point A of a touched locus currently displayed. A touched point Pa corresponds to an end point of the touched locus which is currently being displayed. A touched point Pb is a touched point which is just about to be drawn in the target image. A touched point Pc is a current touched point instructed by the pen tip of the touch pen 42. The delay of drawing d1 is defined as a difference between the touched points Pc and Pb, and the delay of display updating d2 is defined as a difference between the touched points Pc and Pa.

In this embodiment, a frequency of execution of the display updating processing is made one-tenth or one-fifth of that of the drawing processing, and whereby, the delay of display updating d2 can fall in a constant range while the delay of drawing d1 is minimized. Display examples of touched loci in the painting mode and in the notepad mode are shown in FIG. 4(A) and FIG. 4(B), respectively.

Figure 5:
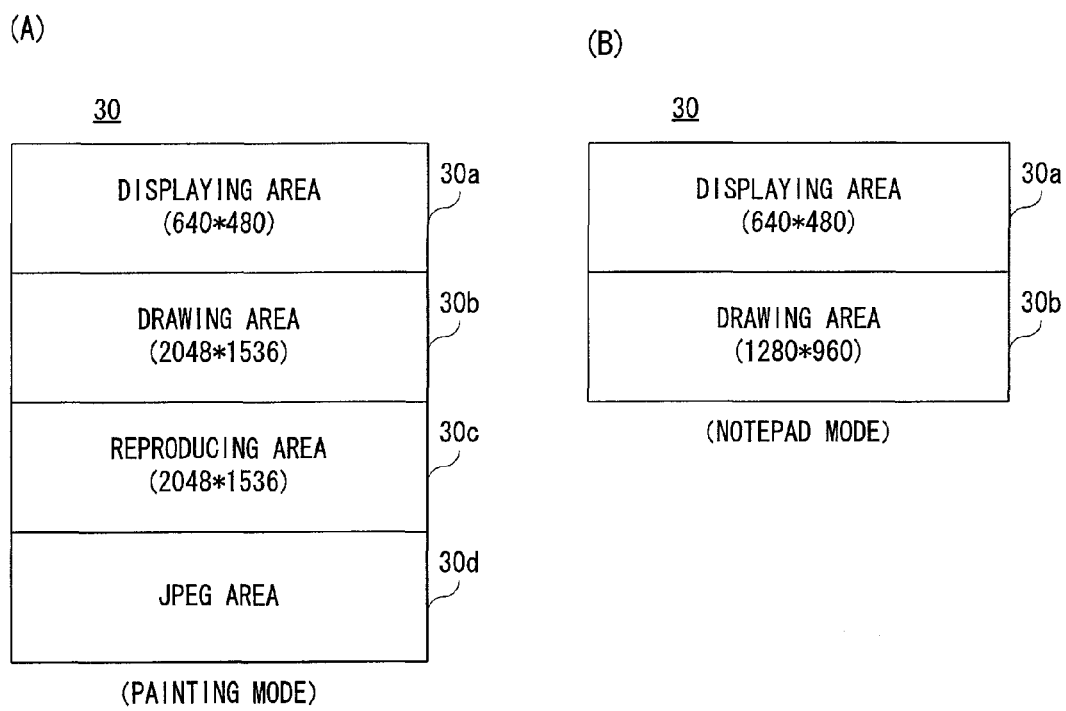
FIG. 5(A) is an illustrative view showing a mapping state of an SDRAM in a case that the painting mode is selected in FIG. 1 embodiment.
FIG. 5(B) is an illustrative view showing a mapping state of the SDRAM in a case that the notepad mode is selected in FIG. 1 embodiment.
Figure 7:
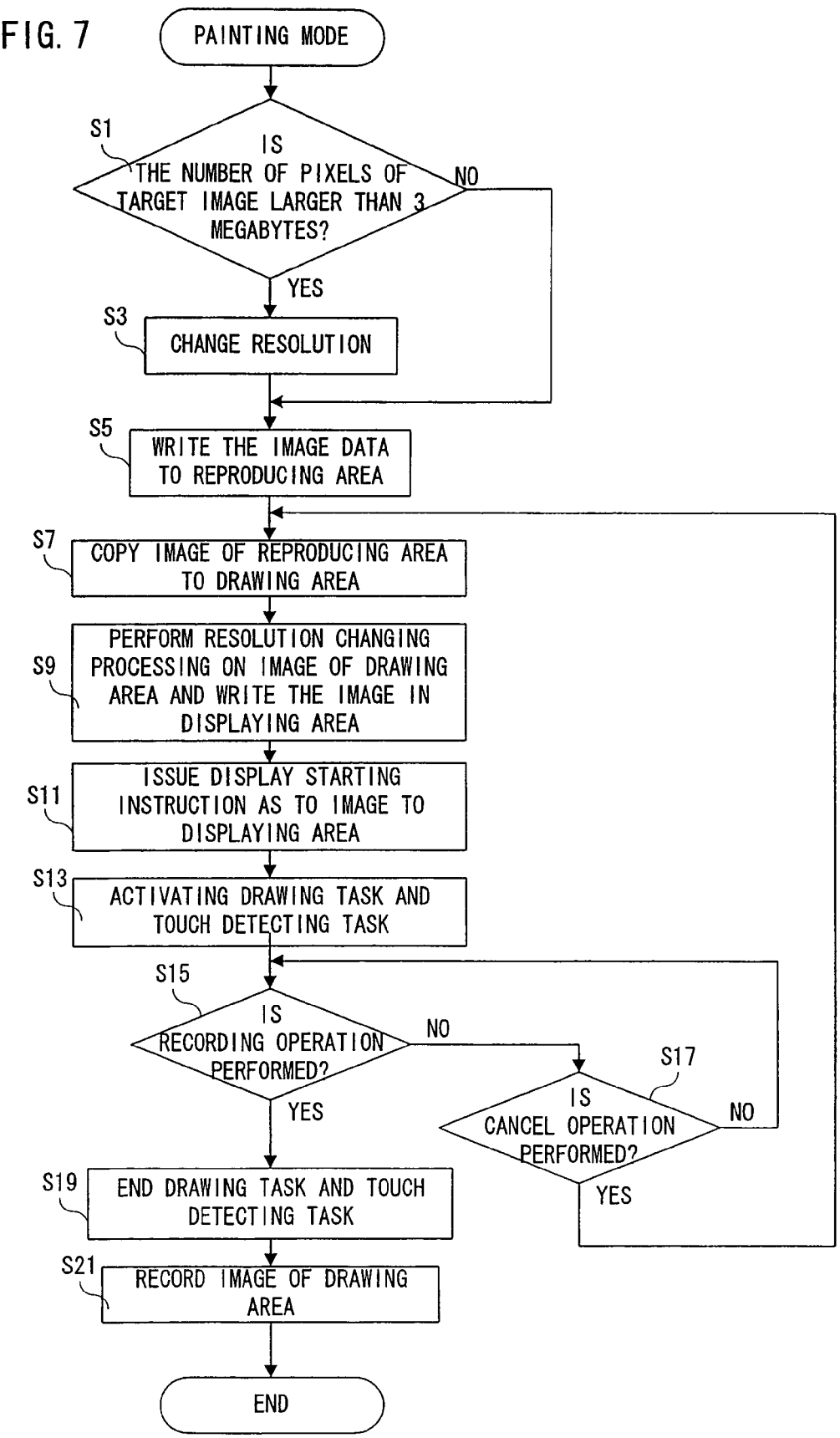
FIG. 7 is a flowchart showing a part of an operation of the CPU applied to FIG. 1 embodiment.
Figure 8:
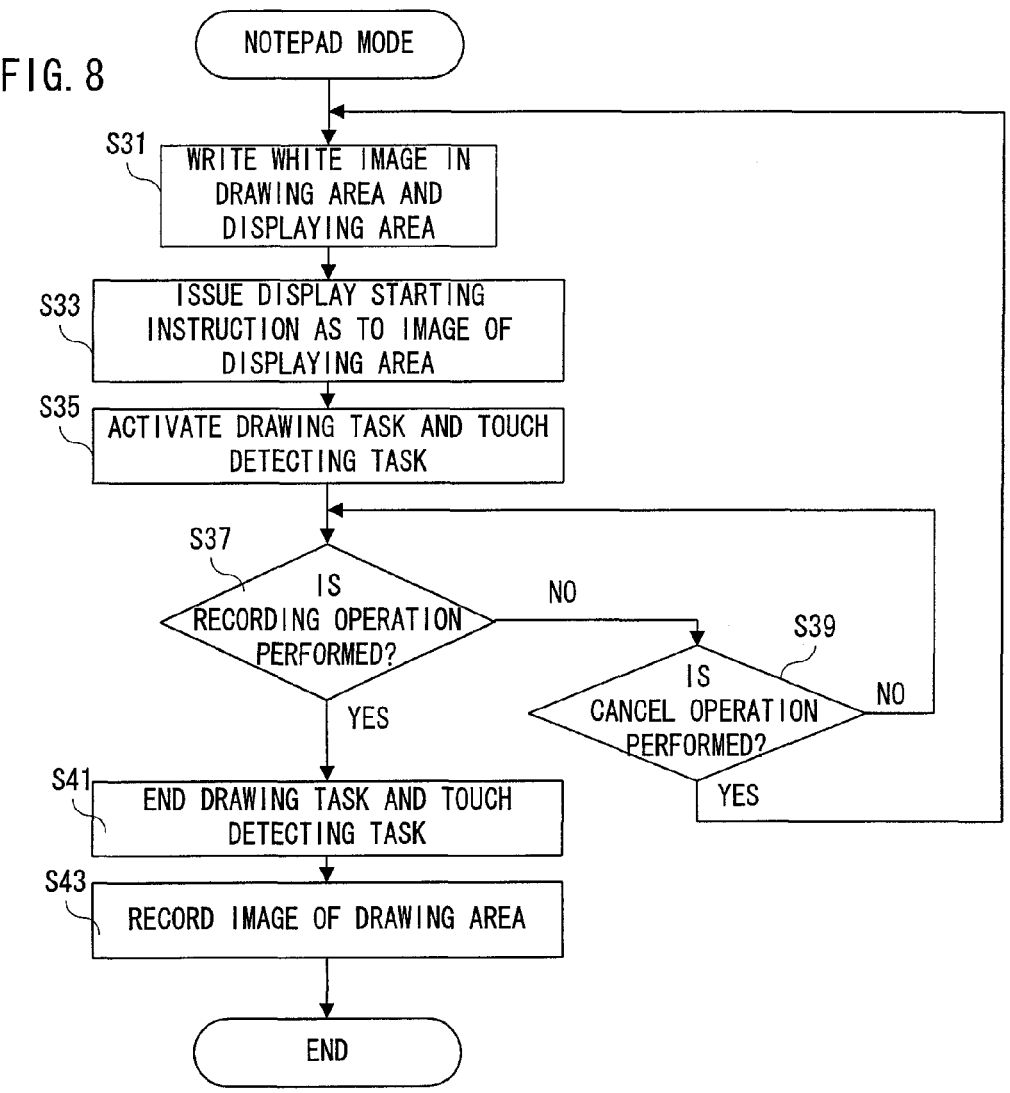
FIG. 8 is a flowchart showing another part of the operation of the CPU applied to FIG. 1 embodiment.
Figure 9:
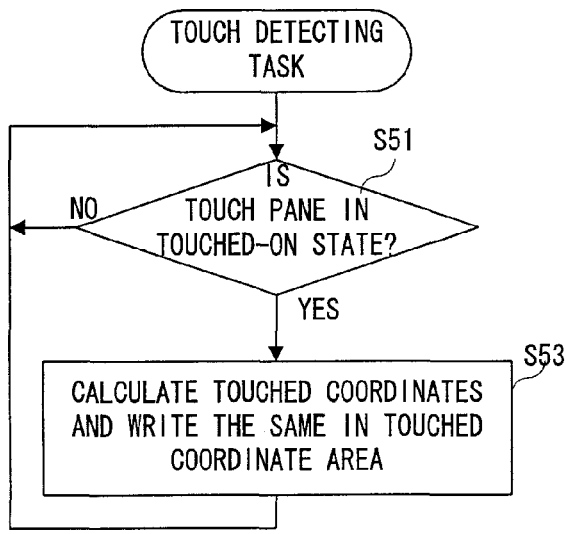
FIG. 9 is a flowchart showing a still another part of the operation of the CPU applied to FIG. 1 embodiment.
Figure 10:
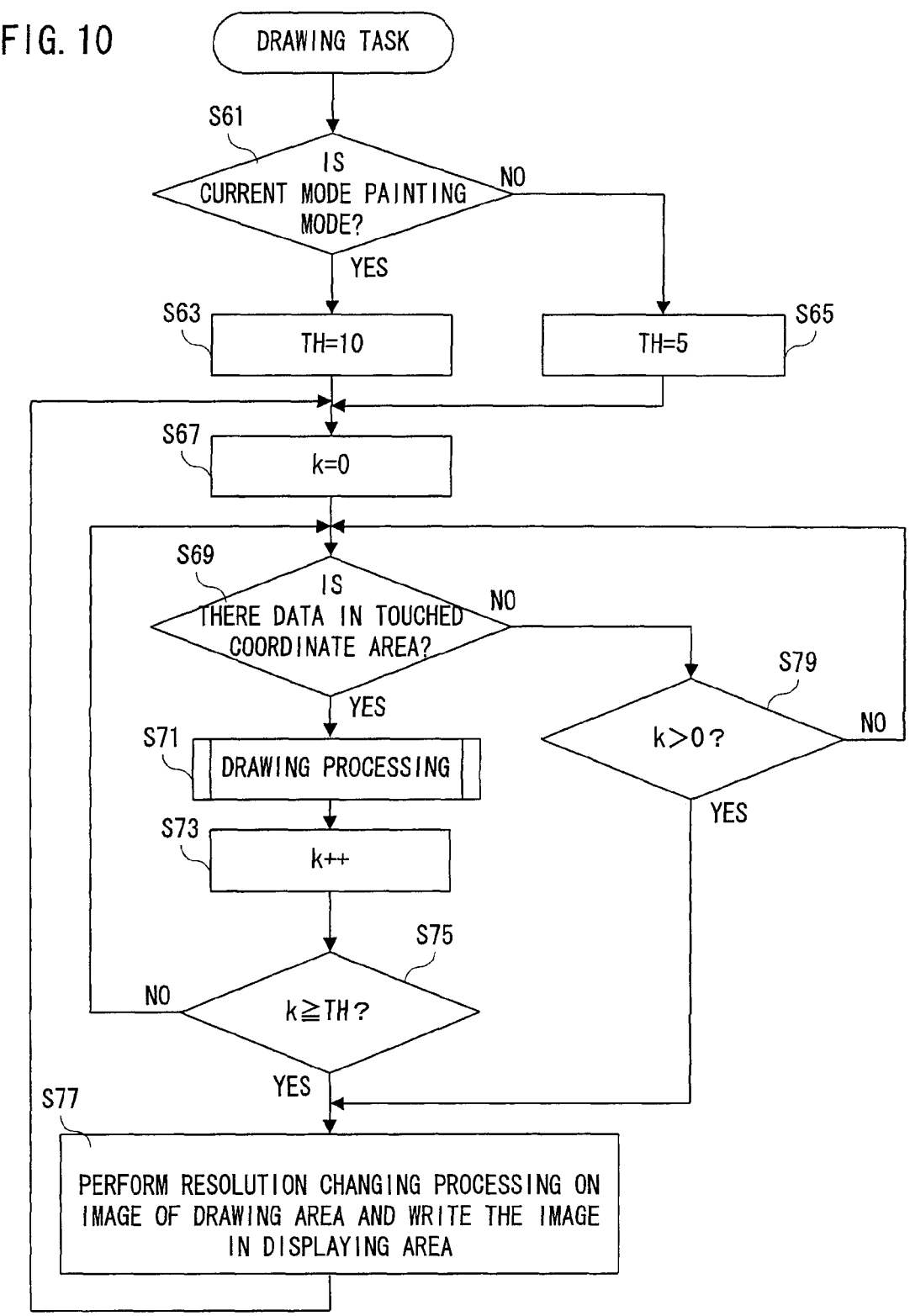
FIG. 10 is a flowchart showing a further part of the operation of the CPU applied to FIG. 1 embodiment.
Figure 11:
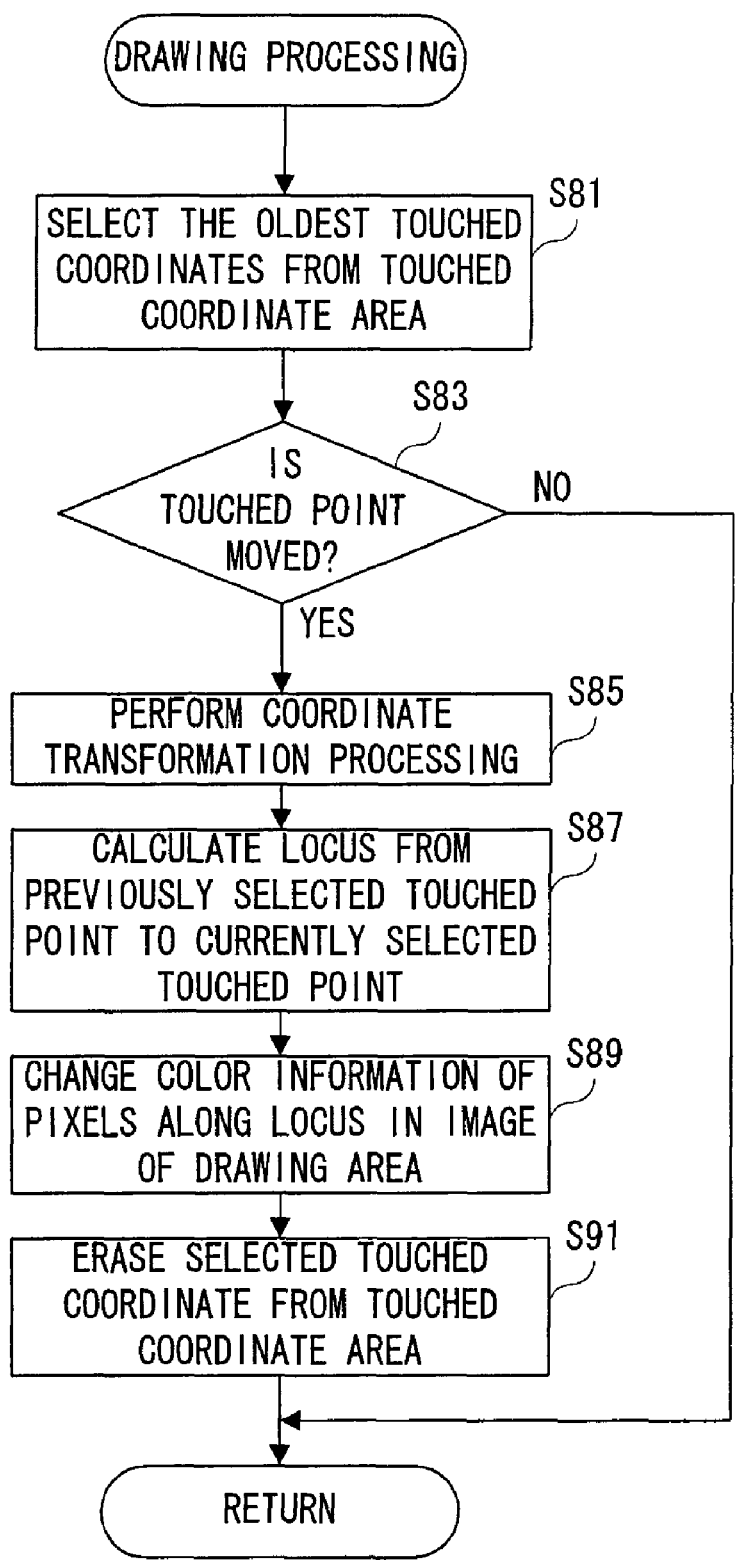
FIG. 11 is a flowchart showing a still further part of the operation applied to FIG. 1 embodiment.

More specifically, when the painting mode is selected, a plurality of areas shown in FIG. 5(A) are formed in the SDRAM 30, and the CPU 24 executes a main task shown in FIG. 7, a touch detecting task shown in FIG. 9, and a drawing task shown in FIG. 10 and FIG. 11 in a parallel manner under the control of the multitasking OS such as μITRON. Here, control programs corresponding to flowcharts shown in FIG. 7-FIG. 11 are stored in the flash memory 36.

In the mode, a desired image file is selected from a plurality of JPEG files stored in the recording medium 40 in advance, and image data is read from the selected JPEG file. The read image data is subjected to expansion processing by the JPEG codec 20 and then stored in a JPEG area 30d of the SDRAM 30.

Referring to FIG. 5(A), the SDRAM 30 includes a reproducing area 30c, a drawing area 30b and a displaying area 30a in addition to the JPEG area 30d. Each of the reproducing area 30c and the drawing area 30b has a size of 2048×1536 pixels, and the displaying area 30a has a size of 640×480 pixels.

Referring to FIG. 7, in a step S1, it is determined whether or not a resolution (the number of pixels) of the target image, that is, the image data of the JPEG area 30d is larger than 2048×1536 (=3 megabytes). It should be noted that the resolution can be informed by Exif (Exchangeable Image File Format) information within the JPEG file.

If "YES" in the step S1, resolution changing processing is performed on the image data in the JPEG area 30d in a step S3. Thus, an image having a resolution of 3 megabytes or more is an image of 3 megabytes. Then, in a step S5, the image data on which the resolution changing processing has been performed is written to the reproducing area 30c. If "NO" in the step S1, the processing in the step S3 is skipped, and the image data of the JPEG area 30d is written to the reproducing area 30c as it is in the step S5.

In a step S7, the image data in the reproducing area 30c is copied in the drawing area 30b. In a step S9, resolution changing processing is performed on the image data in the drawing area 30b. Thus, the image data of 640×480 pixels can be obtained. The image data on which the resolution changing processing has been performed is written to the displaying area 30a of the SDRAM 30 through the memory control circuit 28.

In a step S11, a display starting instruction is issued to the video encoder 32. The video encoder 32 starts an operation of reading the image data from the displaying area 30a through the memory control circuit 28 and converting the read image data into a composite video signal. The reproducing operation is executed at intervals of 1/30 seconds, and whereby, the target image is displayed on the LCD monitor 34.

Then, after a drawing task and a touch detecting task are activated in a step S13, the process enters a loop between steps S15 and S17. The touch detecting task repeatedly detects a touched point, and the drawing task draws an image of the touched locus in the image of the drawing area 30b every time that the touched point is detected. The drawing task also performs resolution changing processing on the image data of the drawing area 30b every time that such drawing processing is executed at ten times, and updates the image data of the displaying area 30a by the converted image data. Accordingly, the result of the drawing processing is reflected on the display image on the LCD monitor 34 at intervals of 1/10 seconds. Thus, the image of the touched locus is reproduced on the target image in 10 touched points as shown in FIG. 4(A). It should be noted that the drawing task and the touch detecting task will be explained later.

In the step S15, the presence or absence of a recording operation is determined, and in a step S17, a presence or absence of a cancel operation is determined. After completion of a series of touch operations, when a recording operation is performed by the key input device 18, the process shifts from the step S15 to a step S19 to end both of the drawing task and touch detecting task. Then, in a step S21, the image data is read from the drawing area 30b through the memory control circuit 28, and the read image is recorded in the recording medium 40 through the I/F 38. When a cancel operation is performed, the process returns from the step S17 to the step S7.

On the other hand, when the notepad mode is selected, a plurality of areas shown in FIG. 5(B) are formed in the SDRAM 30, and the CPU 24 executes in parallel the main task shown in FIG. 8, the touch detecting task shown in FIG. 9 and the drawing task shown in FIG. 10 and FIG. 11.

Referring to FIG. 5(B), the SDRAM 30 includes a drawing area 30b and a displaying area 30a. The drawing area 30b has a size of 1280×960 pixels, and the displaying area 30a has a size of 640×480 pixels.

With reference to FIG. 8, in a step S31, white image data is written to the drawing area 30b. In a step S33, a display starting instruction is issued to the video encoder 32. The video encoder 32 starts an operation of reading the image data from the displaying area 30a through the memory control circuit 28, and converting the read image data into a composite video signal. The reproducing operation is executed at intervals of 1/30 seconds, and whereby, a white image corresponding to the notepad is displayed on the LCD monitor 34.

Then, after the drawing task and the touch detecting task are activated in a step S35, the process enters a loop between steps S37 and S39. The touch detecting task repeatedly detects a touched point, and the drawing task draws an image of a touched locus in the image of the drawing area 30b every time that a touched point is detected. The drawing task also performs resolution changing processing on the image data of the drawing area 30b every time that such drawing processing is executed at five times, and updates the image data of the displaying area 30a by the converted image data. Accordingly, the result of the drawing processing is reflected on the display image of the LCD monitor 34 at intervals of 1/20 seconds. Thus, as shown in FIG. 4(B), the image of the touched locus is reproduced on the white image in five touched points. It should be noted that the drawing task and the touch detecting task will be explained later.

In a step S37, the presence or absence of a recording operation is determined, and in a step S39, the presence or absence of a cancel operation is determined. After a series of touch operations are completed, when a recording operation is performed by the key input device 18, the process shifts from the step S37 to a step S41 to end both of the drawing task and the touch detecting task. Then, in a step S43, the image data is read from the drawing area 30b through the memory control circuit 28, and the read image is recorded in the recording medium 40 through the I/F 38. When a cancel operation is performed, the process returns from the step S39 to the step S31.

With reference to FIG. 9, in a step S51, it is determined whether or not the touch panel 26 is a touched-on state referring to the data of the buffer 26B. If "1" is included in the data of the buffer 26B, "YES" is determined in the step S51, and the process shifts to a step S53. In the step S53, touched coordinates are calculated on the basis of the data of the buffer 26B, and writes a result of the calculation to the touched coordinate area 24Ba of the buffer 24B. Then, the process returns to the step S51. Such a processing is executed at intervals of 1/100 seconds.

With reference to FIG. 10, in a step S61, it is determined whether or not a current mode is the painting mode. If "YES" here, "10" is set to a threshold value TH in a step S63, and if "NO", that is, if a current mode is the notepad mode, "5" is set to the threshold value TH in a step S65. Then, the process shifts to a step S67.

In the step S67, "0" is set to a variable k. In a step S69, it is determined whether or not there is data in the touched coordinate area 24Ba. If "YES" is determined here, the process shifts to a step S71 to execute drawing processing. The drawing processing is executed on the basis of data of one touched point, and the processed data is erased from the touched coordinate area 24Ba (described in detail later).

In a step S73, the variable k is incremented, and in a step S75, it is determined whether or not the variable k reaches the threshold value TH. If "NO" is determined here, the process returns to the step S69. If "YES" in the step S75, resolution changing processing is performed on the image data of the drawing area 30b, and the image data of 640×480 pixels thus obtained is written to the displaying area 30a in a step S77. Then, the process returns to the step S67. Accordingly, the processing in the step S77 is executed once every time that the processing in the step S71 is executed at times being equal to the threshold value TH.

If "NO" in the step S69, it is determined whether or not the variable k is more than 0 in a step S79, and if "NO" here, the process returns to the step S69. If "YES" in the step S79, the process proceeds to the step S77. The step S77 in this case is the end of the processing for reflecting all the results of the executed drawing processing on the display image. That is, in a case that the processing exits from the loop of the steps S69 to S75 in a state of 0<k<TH, by a shift from the step S79 to the step S77, the result of the drawing processing during that time is reflected on the display image.

The drawing processing in the foregoing step S71 is according to FIG. 11. Referring to FIG. 11, in a step S81, the oldest touched coordinate data is selected from the touched coordinate area 24Ba. In a step S83, it is determined whether or not a touched point is moved by comparing currently selected touched coordinate data and previously selected touched coordinate data. If "NO" in the step S83, the process is restored to the hierarchical upper level of the routine, and if "YES", the process shifts to a step S85. In the step S85, coordinate transformation processing is performed on the selected touched coordinate data. Thus, touched coordinate data according to the coordinate system of the drawing area 30b can be obtained. According to the coordinate system of the drawing area 30b, the touched coordinate data is represented by any one of (0, 0)-(2047, 1535). The touched coordinate data on which the coordinate transformation processing has been performed is written to the drawn coordinate area 24Bb.

In a step S87, a touched locus from a previously selected touched point (previously touched point) to a currently selected touched point (currently touched point) is evaluated on the basis of the touched coordinate data of the drawn coordinate area 24Bb. In a step S89, color information of the pixels along the calculated locus is changed in the image data of the drawing area 30b. Then, in a step S91, the currently selected touched coordinate data is erased from the touched coordinate area 24Ba, and the process is restored to the hierarchical upper level of the routine.

As understood from the above, in this embodiment, the target image data is written to the drawing area 30b, and the CPU 24 performs resolution changing processing in a descending direction on the image data of the drawing area 30b. The result of the resolution changing processing is written to the displaying area 30a, and the LCD monitor 34 displays a low-resolution image on the basis of the image data of the displaying area 30a on the display surface 34f.

On the display surface 34f, the detection surface 26f of the touch panel 26 is laminated. When the user performs a touch operation on the touch panel 26 in order to draw or write a picture and a character on the image of the display surface 34f, the CPU 24 repeatedly detects a touched point through the detection surface 26f (S51, S53), and performs drawing processing on the image data of the drawing area 30b on the basis of the detection result point by point (S71). Furthermore, every time that a plurality of drawing processing are executed, resolution changing processing is executed on the image data of the drawing area 30b (S67, S73, S75), and whereby, the image on the display surface 34f is periodically updated.

Thus, a frequency of execution of the resolution changing processing for updating the display is decreased. This reduces a processing load of the CPU 24 and a delay.

Furthermore, the number of executions of the drawing processing required for one resolution changing processing, that is, the threshold value TH is controlled so as to take different values depending on an attribute of the target image data such as a resolution, for example (S61-S65). Thus, it is possible to prevent a delay from occurring depending on the attribute of the image data.

Also, when the drawing processing is ended in a state that the number of executions of the drawing processing after end of the preceding resolution changing processing, that is, the variable k does not satisfy the threshold value TH, resolution changing processing is performed on the image data of the drawing area 30b (S69, S79). Thus, a final result of the drawing processing is always reflected on the display image.

Additionally, in this embodiment, when the resolution of the target image is above 3 megabytes, the resolution of this image is changed to 3 megabytes in advance (S1, S3), but such the resolution changing processing as the initialization processing may be omitted.

Furthermore, although the CPU 24 executes the resolution changing processing in this embodiment, another hardware circuit may be provided for performing a change of resolution. In this case, the CPU 24 only need to perform controlling the hardware circuit, so that it is possible to further reduce the load of the CPU 24, although it is originally low. In addition, the CPU 24 calculates coordinates of a touched point, but this may be performed by the touch panel 26. Additionally, numerical values of a resolution, an interval, a threshold value, etc. are merely one example and may take various values.

In the description above, the electronic camera 10 having the LCD monitor 34 and the touch panel 26 is explained, but the present invention can be applied to a drawing apparatus having a display and a pointing device. As a typical pointing device, there are a tablet, a touch pad, a trackball, a mouse, a keyboard, etc. other than the touch panel. As a drawing apparatus, mention may be made of a PC, a digital TV, a game machine, a mobile phone terminal, etc. other than the electronic camera.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A drawing apparatus, comprising:
    a writer which writes image data to a first memory;
    a first resolution changer which changes a resolution of the image data stored in said first memory into a descending direction, and writes low-resolution image data obtained through the change to a second memory;
    a display which displays an image on the basis of the low-resolution image data stored in said second memory on a display surface;
    a designator which designates an arbitrary point within said display surface that displays the image on the basis of the low-resolution image data stored in the second memory;
    a drawer which performs drawing processing on the image data in said first memory according to a movement of a point designated by said designator on said display surface that displays the image on the basis of the low-resolution image data stored in the second memory; and
    an activator which repetitively activates said first resolution changer and repetitively activates said drawer,
    wherein a frequency at which said drawer is activated by said activator is higher than a frequency at which said first resolution changer is activated by said activator, and said activator alternatively activates said first resolution changer and said drawer.

2. A drawing apparatus according to claim 1, further comprising:
    a detector which repetitively detects a point designated by said designator, and writes position data indicating a position of the detected point in a third memory,
    wherein said drawer performs drawing processing point by point on the image data stored in said first memory on the basis of the position data stored in said third memory, and
    said activator activates said first resolution changer every time that said drawer performs a plurality of executions of the drawing processing.

3. A drawing apparatus according to claim 2, wherein
    said activator activates said first resolution changer when the drawing processing is ended in a state that the number of executions of the drawing processing from a previous activation of said first resolution changer is less than the number of executions of the drawing processing required for a next activation of said first resolution changer.

4. A drawing apparatus according to claim 1, further comprising an importance controller which controls importance that said activator places on said drawer so as to take a different value depending on an attribute of the image data stored in said first memory.

5. A drawing apparatus according to claim 4, further comprising:
    an imager which images an object scene image, wherein said writer writes the image data imaged by said imager to said first memory in response to a first mode selecting operation.

6. A drawing apparatus according to claim 5, wherein
    said writer writes preset image data to said first memory in response to a second mode selecting operation.

7. A drawing apparatus according to claim 6, further comprising:
    a determiner which determines whether or not a resolution of the image data that said writer intends to write is larger than a preset value; and
    a second resolution changer which changes a resolution of the image data that said first writer intends to write is changed in a descending direction when a determination result by said determiner is affirmative.

8. A drawing apparatus according to claim 7, wherein
    the resolution of said preset image data is smaller than said preset value.

9. A drawing apparatus according to claim 1, wherein
    the drawing processing by said drawer is processing of drawing a locus of points to be designated by said designator.

10. A drawing apparatus according to claim 1, further comprising a recorder which records the image data stored in said first memory in a recording medium in response to a recording operation.

11. A drawing apparatus according to claim 1, wherein
    said designator includes a touch panel having a detection surface which is laminated on said display surface.

12. A recording medium recording a control program of a drawing apparatus including a display having a display surface and a designator for designating an arbitrary point within said display surface, wherein said control program, when executed, causes a processor of said drawing apparatus to execute a method comprising:
    writing image data to a first memory;
    changing a resolution of the image data stored in said first memory into a descending direction, and writing low-resolution image data obtained through the change to a second memory;
    displaying an image on the basis of the low-resolution image data stored in said second memory on said display surface;
    performing drawing processing on the image data in said first memory according to a movement of a point designated by said designator on said display surface that displays the image on the basis of the low-resolution image data stored in the second memory; and
    repetitively activating said changing the resolution of the image data stored in said first memory and repetitively activating said drawing processing performed on the image data in said first memory,
    wherein a frequency at which said drawing processing on the image data in said first memory is repetitively activated is higher than a frequency at which said changing the resolution of the image data in said first memory is repetitively activated, and said repetitively activating alternatively activates said changing the resolution and said drawing processing.

13. A controlling method of a drawing apparatus including a display having a display surface and a designator for designating an arbitrary point within said display surface, comprising:
    writing image data to a first memory;
    changing a resolution of the image data stored in said first memory into a descending direction, and writing low-resolution image data obtained through the change to a second memory;

displaying an image on the basis of the low-resolution image data stored in said second memory on said display surface;

performing drawing processing on the image data in said first memory according to a movement of a point designated by said designator on said display surface that displays the image on the basis of the low-resolution image data stored in the second memory; and repetitively activating said changing the resolution of the image data stored in said first memory and repetitively activating said drawing processing performed on the image data in said first memory, wherein a frequency at which said drawing processing on the image data in said first memory is repetitively activated is higher than a frequency at which said changing the resolution of the image data in said first memory is repetitively activated, and said repetitively activating alternatively activates said changing the resolution and said drawing processing.

* * * * *